US009765468B2

(12) United States Patent
Kim et al.

(10) Patent No.: US 9,765,468 B2
(45) Date of Patent: Sep. 19, 2017

(54) MOTOR DRIVING APPARATUS AND LAUNDRY TREATMENT MACHINE INCLUDING THE SAME

(71) Applicants: LG ELECTRONICS INC., Seoul (KR); SEOUL NATIONAL UNIVERSITY R&DB FOUNDATION, Seoul (KR)

(72) Inventors: Kyunghoon Kim, Changwon-si (KR); Jayeong Yu, Seoul (KR); Seungjun Chee, Seoul (KR); Seungki Sul, Seoul (KR); Minho Jang, Changwon-si (KR)

(73) Assignee: LG ELECTRONICS INC. SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 289 days.

(21) Appl. No.: 14/536,004

(22) Filed: Nov. 7, 2014

(65) Prior Publication Data
US 2015/0128662 A1  May 14, 2015

(30) Foreign Application Priority Data
Nov. 8, 2013  (KR) .................. 10-2013-0135659

(51) Int. Cl.
*D06F 37/30* (2006.01)
*D06F 33/02* (2006.01)
(Continued)

(52) U.S. Cl.
CPC ............ *D06F 37/304* (2013.01); *D06F 33/02* (2013.01); *H02P 6/182* (2013.01); *H02P 6/20* (2013.01);
(Continued)

(58) Field of Classification Search
None
See application file for complete search history.

(56) References Cited

U.S. PATENT DOCUMENTS

2009/0056385 A1   3/2009  Maekawa

FOREIGN PATENT DOCUMENTS

CN            1375125      10/2002
CN          101383583       3/2009
(Continued)

OTHER PUBLICATIONS

JP Pub. No. 2001-238480 translation.*
(Continued)

*Primary Examiner* — Michael Barr
*Assistant Examiner* — Rita Adhlakha
(74) *Attorney, Agent, or Firm* — KED & Associates, LLP

(57) ABSTRACT

The laundry treatment machine, absent a position sensor to sense the rotor position of a motor, includes a driving unit having an DC/AC inverter, an voltage detection unit to detect output voltage, and an inverter controller to control the inverter. The output voltage detection unit includes a plurality of resistors connected between the inverter and the motor and a comparator to compare voltage detected by some of the resistors with reference voltage and to detect pulse width modulation (PWM)-based output voltage. The voltage detection unit outputs the PWM-based output voltage output from the comparator to the inverter controller in a first mode in which at least one switching device of the inverter is turned on. The voltage detection unit outputs voltage detected by other some of the resistors to the inverter controller in a second mode in which all switching devices of the inverter are turned off.

17 Claims, 13 Drawing Sheets

(51) Int. Cl.
*H02P 6/182* (2016.01)
*H02P 6/20* (2016.01)

(52) U.S. Cl.
CPC ...... *D06F 2202/12* (2013.01); *D06F 2204/06* (2013.01); *Y02B 40/52* (2013.01)

(56) References Cited

FOREIGN PATENT DOCUMENTS

| | | |
|---|---|---|
| CN | 101964624 | 2/2011 |
| CN | 102291079 | 12/2011 |
| CN | 102437813 | 5/2012 |
| CN | 102487262 | 6/2012 |
| CN | 102545749 | 7/2012 |
| EP | 1 221 765 A1 | 7/2002 |
| EP | 2 629 414 A1 | 8/2013 |
| JP | 2001-161094 | 6/2001 |
| JP | 2001-238480 A | 8/2001 |
| JP | 2003-135883 | 5/2003 |
| JP | 2007-236048 A | 9/2007 |
| JP | 2007-236102 A | 9/2007 |
| JP | 2009-065764 | 3/2009 |
| KR | 10-2006-0068845 A | 6/2006 |
| KR | 10-0629007 B1 | 9/2006 |
| WO | WO 2011/054032 A1 | 5/2011 |

OTHER PUBLICATIONS

Australian Examination Report dated Apr. 15, 2015 issued in Application No. 2014259483.
Australian Examination Report dated Apr. 15, 2015 issued in Application No. 2014259555.
Chinese Office Action dated May 4, 2016 issued in Application No. 201410645337.8 (English translation attached).
Chinese Office Action dated May 4, 2016 issued in Application No. 201410643600.X (English translation attached).
Chinese Office Action dated May 5, 2016 issued in Application No. 201410643584.4 (English translation attached).
European Search Report dated Jun. 3, 2015 issued in Application No. 14192291.4.
Song Chi, et al: "Sliding-Mode Sensorless Control of Direct-Drive PM Synchronous Motors for Washing Machine Applications"; IEEE Transactions on Industry Applications, IEEE Service Center; Piscataway, NJ; vol. 45, No. 2; Mar. 1, 2009; pp. 582-590 (XP 011253774).
European Search Report dated Jul. 28, 2015 issued in Application No. 14192222.9.
U.S. Office Action dated Dec. 2, 2016 issued in co-pending U.S. Appl. No. 14/535,595.
U.S. Appl. No. 14/535,702, filed Nov. 7, 2014, Rita P. Adhlakha.
U.S. Appl. No. 14/535,780, filed Nov. 7, 2014, Rita P. Adhlakha.
U.S. Appl. No. 14/535,595, filed Nov. 7, 2014, Rita P. Adhlakha.
Chinese Office Action dated Sep. 1, 2016 issued in Application No. 201410645240.7 (with English translation).
Korean Office Action dated Oct. 4, 2016 issued in Application No. 10-2013-0135654.
Korean Office Action dated Oct. 4, 2016 issued in Application No. 10-2013-0135656.
Korean Office Action dated Oct. 4, 2016 issued in Application No. 10-2013-0135657.
United States Office Action dated Nov. 1, 2016 issued in U.S. Appl. No. 14/535,702.
United States Office Action dated Nov. 14, 2016 issued in U.S. Appl. No. 14/535,780.

* cited by examiner

MOTOR DRIVING APPARATUS AND LAUNDRY TREATMENT MACHINE INCLUDING THE SAME

CROSS-REFERENCE TO RELATED APPLICATION

This application claims priority under 35 U.S.C. §119 to Korean Application No. 10-2013-0135659, filed on Nov. 8, 2013 in the Korean Intellectual Property Office, which is incorporated herein by reference.

BACKGROUND

1. Field

The present disclosure relates to a motor driving apparatus and a laundry treatment machine including the same.

2. Background

Generally, a laundry treatment machine washes laundry using frictional force between a washing tub rotated by a driving force of a motor and the laundry in a state in which the laundry is contained in the washing tub together with a detergent and wash water. The laundry treatment machine generally includes a position sensor to sense a rotor position of the motor. However, a laundry treatment machine which does not use a position sensor has difficulty in accurately estimating the rotor position of the motor.

BRIEF DESCRIPTION OF THE DRAWINGS

The embodiments will be described in detail with reference to the following drawings in which like reference numerals refer to like elements wherein.

DETAILED DESCRIPTION

Figure 1:
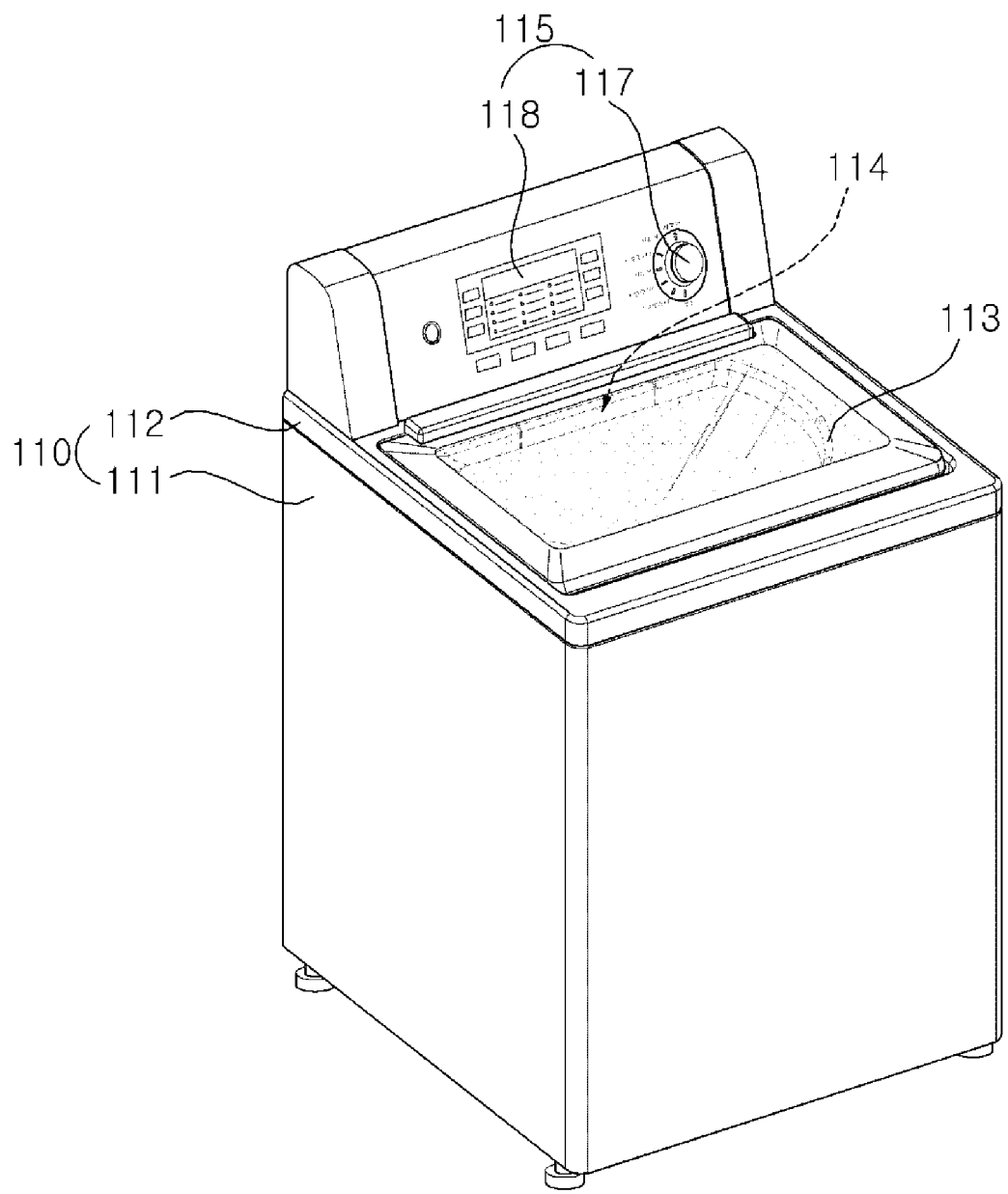
FIG. 1 is a perspective view showing a laundry treatment machine according to an embodiment of the present disclosure.
Figure 2:
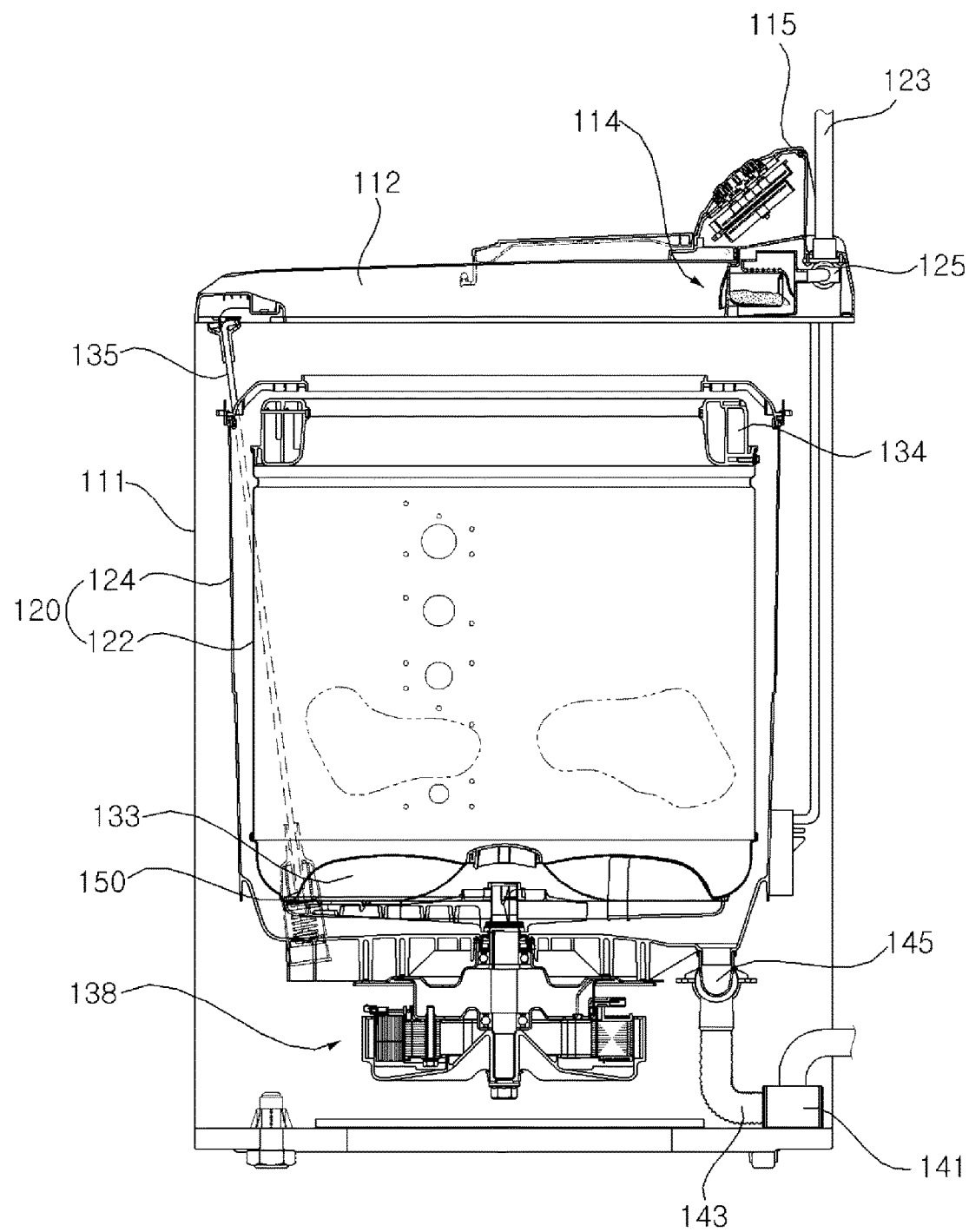
FIG. 2 is a side sectional view of the laundry treatment machine shown in FIG. 1.

FIG. 1 is a perspective view showing a laundry treatment machine according to an embodiment of the present disclosure and FIG. 2 is a side sectional view of the laundry treatment machine shown in FIG. 1.

Referring to FIGS. 1 and 2, a laundry treatment machine 100 according to an embodiment of the present disclosure is a top load type laundry treatment machine configured such that laundry is introduced into a washing tub from above. The top load type laundry treatment machine includes a washing machine that washes, rinses, and spin-dries laundry introduced thereinto and a drying machine that dries wet laundry introduced thereinto.

The washing machine 100 includes a casing 110 forming the external appearance or housing of the washing machine 100, a control panel 115 including manipulation keys for allowing a user to input various control commands, a display for displaying information for a user regarding an operation state of the washing machine 100, and a door 113 hinged to the casing 110 for opening and closing an introduction port through which laundry is introduced and removed.

The casing 110 may include a main body 111 defining a space in which various components of the washing machine 100 are received and a top cover 112 provided at the upper side of the main body 111. The top cover 112 defines a laundry introduction port through which laundry is introduced into an inner tub 122.

Although the casing 110 is described as including the main body 111 and the top cover 112, the present disclosure is not limited thereto. For example, the casing 110 may merely form the external appearance of the washing machine 100. Although a support bar 135 is described as being coupled to one of the components constituting the casing 110, e.g. the top cover 112, the present disclosure is not limited thereto. For example, the support bar 135 may be coupled to any fixed part of the casing 110.

The control panel 115 includes manipulation keys 117 for allowing a user to manipulate an operation state of the washing machine 100 and a display 118 disposed at one side of the manipulation keys 117 for displaying the operation state of the washing machine 100. The door 113 opens and closes the laundry introduction port formed at the top cover 112. The door 113 may include a transparent member, such as tempered glass, through which the user may see the interior of the main body 111.

The washing machine 100 may include a washing tub 120. The washing tub 120 may include an outer tub 124 for containing wash water and an inner tub 122 rotatably mounted in the outer tub 124 for receiving laundry. At the upper part of the washing tub 120 may be mounted a balancer 134 for compensating for eccentricity of the washing tub 120 generated during rotation of the washing tub 120. The washing machine 100 may include a pulsator 133 rotatably mounted at the lower part of the washing tub 120.

A driving device 138 provides driving force necessary for rotating the inner tub 122 and/or the pulsator 133. The washing machine 100 may include a clutch for selectively transmitting the driving force of the driving device 138 to the inner tub 122 and the pulsator 133 such that only the inner tub 122 is rotated, only the pulsator 133 is rotated, or both the inner tub 122 and the pulsator 133 are rotated. The driving device 138 is operated by a driving unit 220, i.e. a driving circuit, shown in FIG. 3.

The top cover 112 is removably provided with a detergent box 114 for receiving various additives, such as a detergent, a fabric softener, and/or a decolorant. Wash water is introduced through a water supply channel 123 and is supplied into the inner tub 122 via the detergent box 114. The inner tub 122 is provided with a plurality of holes through which the wash water supplied into the inner tub 122 flows into the outer tub 124. The washing machine 100 may include a water supply valve 125 for controlling the water supply channel 123.

The wash water may be drained from the outer tub 124 through a drainage channel 143. The washing machine 100 may include a drainage valve for controlling the drainage channel 143 and a drainage pump 141 for pumping the wash water out.

The outer tub 124 is suspended in the casing 110 by the support bar 135. One end of the support bar 135 is connected to the casing 110 and the other end of the support bar 135 is connected to the outer tub 124 via a suspension 150. The suspension 150 absorbs vibration of the outer tub 124 during operation of the washing machine 100. For example, the outer tub 124 may be vibrated by vibration generated from the inner tub 122 during rotation of the inner tub 122. The suspension 150 may absorb vibration generated from the outer tub 124 due to various causes, such as eccentricity of laundry received in the inner tub 122, rotational speed of the inner tub 122, or resonance characteristics of the inner tub 122, during rotation of the inner tub 122.

Figure 3:
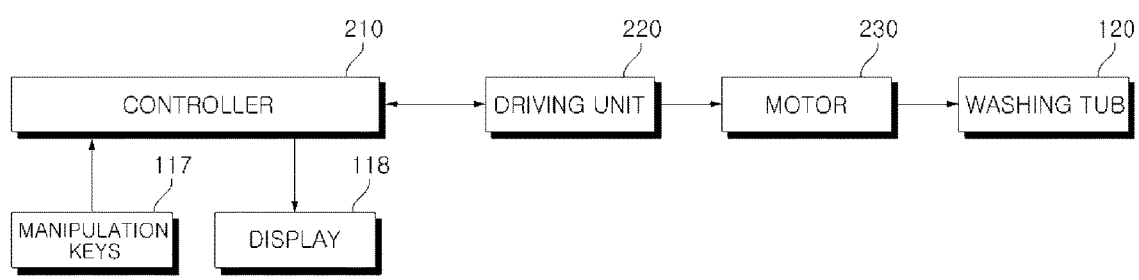
FIG. 3 is an internal block diagram of the laundry treatment machine shown in FIG. 1.

FIG. 3 is an internal block diagram of the laundry treatment machine shown in FIG. 1. A driving unit 220 of the laundry treatment machine 100 is controlled by a controller 210. The driving unit 220 controls a motor 230, and the washing tub 120 is rotated by the motor 230.

The controller 210 is operated according to an operation signal from the manipulation keys 117. Based on input to the key 117, washing, rinsing, and spin-drying cycles of the laundry treatment machine 100 may be carried out. The controller 210 may also control the display 118 to display a washing course, washing time, spin-drying time, rinsing time, or a current operation state.

The controller 210 may control the driving unit 220 to operate the motor 230. A position sensing unit for sensing the position of a rotor of the motor is not provided at the inside or the outside of the motor 230. The driving unit 220 controls the motor 230 in a sensorless mode.

The driving unit 220 drives or controls the motor 230. The driving unit 220 may include an inverter, an inverter controller, an output current detection unit or an output current detector E (see FIG. 4) for detecting output current $i_o$ flowing in the motor 230, and an output voltage detection unit or an output voltage detector F (see FIG. 4) for detecting output voltage $V_o$ applied to the motor 230. The driving unit 220 may further include a converter for supplying a direct current (DC) voltage to be input the inverter.

For example, an inverter controller 430 (see FIG. 4) of the driving unit 220 estimates the position of the rotor of the motor 230 based on the output current $i_o$ and the output voltage $V_o$ and controls the motor 230 to be rotated based on the estimated position of the rotor.

Specifically, the inverter controller 430 (see FIG. 4) generates a pulse width modulation (PWM)-based switching control signal $S_{ic}$ (see FIG. 4) based on the output current $i_o$ and the output voltage $V_o$ and outputs the generated switching control signal $S_{ic}$ to the inverter. The inverter performs a high-speed switching operation to supply AC voltage of a predetermined frequency to the motor 230. The motor 230 is rotated by the AC voltage of the predetermined frequency.

The controller 210 may sense laundry quantity based on the output current $i_o$ detected by the output current detection unit E. For example, the controller 210 may sense laundry quantity based on a current value $i_o$ of the motor 230 during rotation of the washing tub 120. The controller 210 may also sense eccentric quantity of the washing tub 120, i.e. unbalance (UB) of the washing tub 120. The eccentric quantity of the washing tub 120 may be sensed based on a ripple component of the output current $i_o$ detected by the output current detection unit E or change quantity of rotational speed of the washing tub 120.

Figure 4:
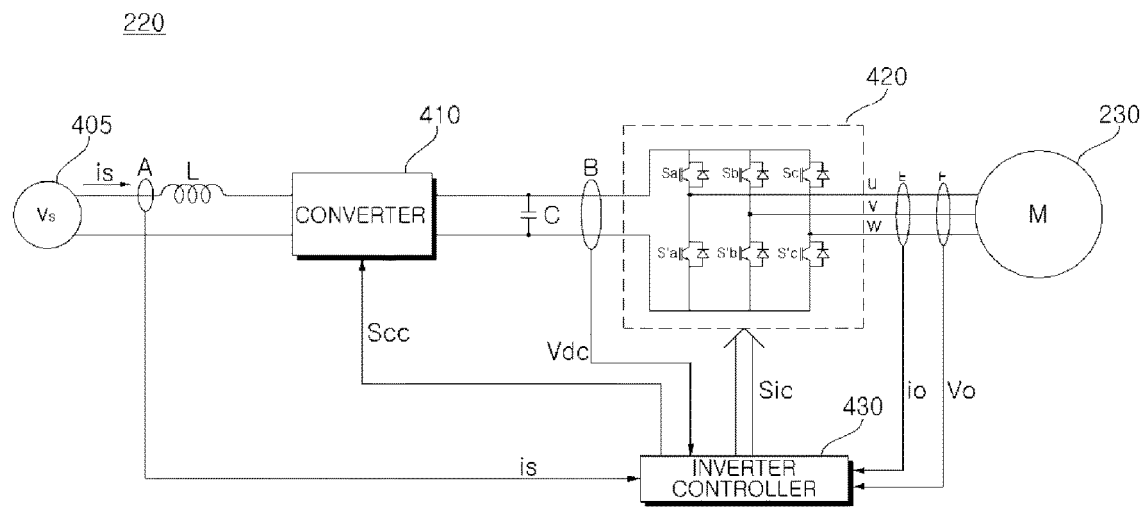
FIG. 4 is an internal circuit diagram of a driving unit shown in FIG. 3.

FIG. 4 is an internal circuit diagram of the driving unit shown in FIG. 3. The driving unit or circuit 220 according to the embodiment of the present disclosure drives or controls a sensorless motor. The driving unit 220 may include a converter 410, an inverter 420, an inverter controller 430, a DC terminal voltage detection unit voltage detector B, a smoothing capacitor C, an output current detection unit or current detector E, and an output voltage detection unit or voltage detector F. The driving unit 220 may further include an input current detection unit A and an inductor L.

The inductor L is disposed between a commercial AC voltage source 405 ($V_s$) and the converter 410 for performing a power factor correction or boosting operation. In addition, the inductor L may function to restrict harmonic current due to high-speed switching of the converter 410.

The input current detection unit or input current detector A may detect input current $i_s$ input from the commercial AC voltage source 405. To this end, a current transformer (CT) or a shunt resistor may be used as the input current detection unit A. The detected input current $i_s$, which is a pulse type discrete signal, may be input to the inverter controller 430.

The converter 410 converts voltage having output from the commercial AC voltage source 405 and passed through the inductor L into DC voltage and outputs the converted DC voltage. Although the commercial AC voltage source 405 is shown as a single phase AC voltage source in the drawing, the commercial AC voltage source 405 may be a three phase AC voltage source. The internal structure of the converter 410 is changed based on the type of the commercial AC voltage source 405. The converter 410 may include only diodes without a switching device. In this case, the converter 410 may perform a rectification operation without an additional switching operation.

For example, four diodes may be arranged in the shape of a bridge for the single phase AC voltage source and six diodes may be arranged in the shape of a bridge for the three phase AC voltage source. Alternatively, a half-bridge type converter including two switching devices and four diodes connected to the switching devices may be used as the converter 410. On the other hand, six switching devices and six diodes may be used for the three phase AC voltage source. In a case in which the converter 410 includes a switching device, boosting, power factor improvement, and DC voltage conversion may be performed according to a switching operation of the switching device.

The smoothing capacitor C smooths input voltage and stores the smoothed voltage. Although one smoothing capacitor C is shown in the drawing, a plurality of smoothing capacitors C may be provided to secure device stability. Although the smoothing capacitor C is shown as being connected to the output terminal of the converter 410 in the drawing, DC voltage may be directly input to the smoothing capacitor C. For example, DC voltage from a solar cell may be directly input to the smoothing capacitor C or may be DC/DC converted and then input to the smoothing capacitor C.

Both terminals of the smoothing capacitor C may be referred to as DC terminals or DC link terminals since DC voltage is stored in the smoothing capacitor C. The DC terminal voltage detection unit B may detect DC terminal voltage $V_{dc}$ applied between the both terminals of the smoothing capacitor C. To this end, the DC terminal voltage detection unit B may include a resistor and an amplifier. The detected DC terminal voltage $V_{dc}$, which is a pulse type discrete signal, may be input to the inverter controller 430.

The inverter 420 may include a plurality of inverter switching devices. The inverter 420 may convert the smoothed DC terminal voltage $V_{dc}$ into three phase AC voltages $V_a$, $V_b$, and $V_c$ of predetermined frequencies according to on/off operations of the switching devices and output the converted three phase AC voltages $V_a$, $V_b$, and $V_c$ to the motor 230 as a three phase synchronous motor.

In the inverter 420, first switching devices or transistors Sa, Sb, and Sc and second switching devices or transistors S'a, S'b, and S'c are connected, respectively, in series to each other in pairs. Three pairs of first and second switching devices Sa &S'a, Sb &S'b, and Sc&S'c are connected in parallel to one another. A diode is connected in reverse parallel to each of the switching devices Sa, S'a, Sb, S'b, Sc, and S'c. The switching devices of the inverter 420 are turned on/off based on an inverter switching control signal $S_{ic}$ from the inverter controller 430. Three phase AC voltages of predetermined frequencies are output to three phase synchronous motor 230.

The inverter controller 430 may control a switching operation of the inverter 420 in a sensorless mode. To this end, the inverter controller 430 may receive the output current $i_o$ detected by the output current detection unit E and the output voltage $V_o$ detected by the output voltage detection unit F.

The inverter controller 430 outputs the inverter switching control signal $S_{ic}$ to the inverter 420 so as to control the switching operation of the inverter 420. The inverter switching control signal $S_{ic}$, which is a PWM-based switching control signal, is generated and output based on the output current $i_o$ detected by the output current detection unit E and the output voltage $V_o$ detected by the output voltage detection unit F. Output of the inverter switching control signal $S_{ic}$ from the inverter controller 430 will hereinafter be described in detail with reference to FIGS. 5A and 5B.

The output current detection unit E detects output current $i_o$ flowing between the inverter 420 and the three phase synchronous motor 230. The output current detection unit E detects current flowing in the motor 230. The output current detection unit E may detect all three phase output currents $i_a$, $i_b$, and $i_c$. Alternatively, the output current detection unit E may detect two phase output currents using three phase equilibrium. The output current detection unit E may be located between the inverter 420 and the motor 230. In order to detect current, a current transformer (CT) or a shunt resistor may be used as the output current detection unit E.

In a case in which a plurality of shunt resistors is used, three shunt resistors may be located between the inverter 420 and the synchronous motor 230 or one end of each of three shunt resistors may be connected to a corresponding one of the three lower arm switching devices S'a, S'b, and S'c of the inverter 420. Alternatively, two shunt resistors may be used based on three phase equilibrium. In a case in which one shunt resistor is used, the shunt resistor may be disposed between the capacitor C and the inverter 420.

The detected output current $i_o$, which is a pulse type discrete signal, may be input to the inverter controller 430. An inverter switching control signal $S_{ic}$ is generated based on the detected output current $i_o$. In the following description, the detected output current $i_o$ may correspond to three phase output currents $i_a$, $i_b$, and $i_c$.

The output voltage detection unit F is located between the inverter 420 and the motor 230 for detecting output voltage applied from the inverter 420 to the motor 230. In a case in which the inverter 420 is operated according to a PWM-based switching control signal, the output voltage may be PWM-based pulse type voltage.

In order to detect the PWM-based pulse type voltage, the output voltage detection unit F may include a resistor electrically connected between the inverter 420 and the motor 230 and a comparator connected to one end of the resistor. The output voltage detection unit F will hereinafter be described in detail with reference to FIG. 8A.

The detected PWM-based output voltage $V_o$, which is a pulse type discrete signal, may be applied to the inverter controller 430. An inverter switching control signal $S_{ic}$ is generated based on the detected output voltage $V_o$. In the following description, the detected output voltage $V_o$ may correspond to three phase AC voltages $V_a$, $V_b$, and $V_c$.

The three phase synchronous motor 230 may include stators and a rotor. All three phase AC voltages of predetermined frequencies are applied to coils of all three phase (a-phase, b-phase, and c-phase) stators to rotate the rotor. For example, the motor 230 may be a Surface-Mounted Permanent-Magnet Synchronous Motor (SMPMSM), Interior Permanent Magnet Synchronous Motor (IPMSM), or a Synchronous Reluctance Motor (SynRM). The SMPMSM and the IPMSM are Permanent Magnet Synchronous Motors (PMSM), each having a permanent magnet, whereas the SynRM is a motor having no permanent magnet.

In a case in which the converter 410 includes a switching device, the inverter controller 430 may control a switching operation of the switching device of the converter 410. To this end, the inverter controller 430 may receive the input current $i_s$ detected by the input current detection unit A. The inverter controller 430 may also output a converter switching control signal $S_{cc}$ to the converter 410 so as to control a switching operation of the converter 410. The converter switching control signal $S_{cc}$, which is a PWM-based switching control signal, is generated and output based on the input current $i_s$ detected by the input current detection unit A.

Figure 5A:
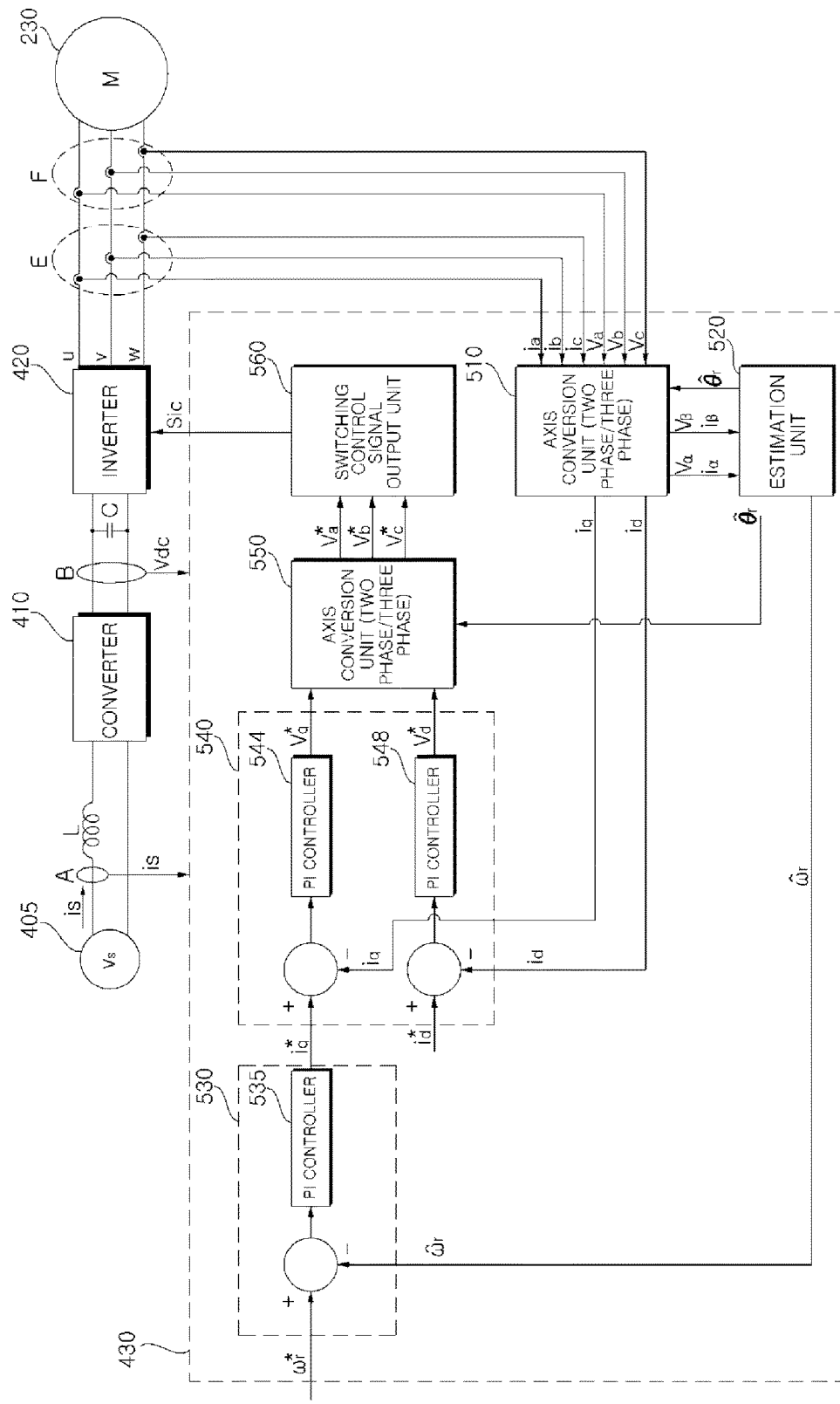
FIG. 5A is an internal block diagram of an inverter controller shown in FIG. 4.
Figure 5B:
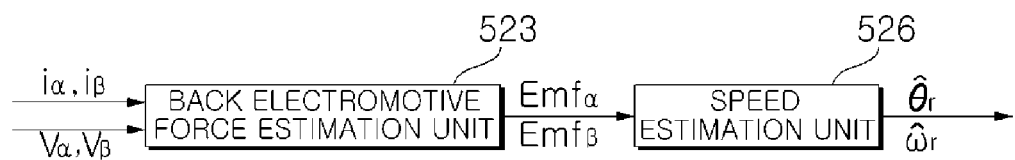
FIG. 5B is an internal block diagram of an estimation unit shown in FIG. 5A.

FIG. 5A is an internal block diagram of the inverter controller shown in FIG. 4 and FIG. 5B is an internal block diagram of an estimation unit shown in FIG. 5A.

Referring to FIG. 5A, the inverter controller 430 may include an axis conversion circuitry or unit 510, an estimation circuitry or unit 520, a current command generation circuitry or unit 530, a voltage command generation circuitry or unit 540, an axis conversion circuitry or unit 550, and a switching control signal output unit or circuitry 560.

The axis conversion unit 510 may receive the output currents $i_a$, $i_b$, and $i_c$ detected by the output current detection unit E and transform the received output currents $i_a$, $i_b$, and $i_c$ into two phase currents $i_\alpha$ and $i_\beta$ of a stationary coordinate system and two phase currents $i_d$ and $i_q$ of a rotating coordinate system.

The axis conversion unit 510 receives the PWM-based output voltages $V_a$, $V_b$, and $V_c$ detected by the output voltage detection unit F to calculate a duty and calculates pole voltage $V_{pn}$ based on the calculated duty. Equation 1 below shows a pole voltage calculation method.

$$Vpn = \frac{1}{T}\int Vdc\,dt = Vdc\frac{Ton}{T} \qquad \text{[Equation 1]}$$

where $V_{dc}$ indicates DC terminal voltage detected by the DC terminal voltage detection unit B, T indicates a control time period, i.e. a unit time period of a carrier signal for generating a PWM switching control signal, and $T_{on}$ indicates ON time, i.e. a duty, within a unit time period T. The axis conversion unit 510 calculates three phase pole voltages $V_{un}$, $V_{vn}$, and $V_{wn}$ in response to the PWM-based three phase output voltages $V_a$, $V_b$, and $V_c$. The axis conversion unit 510 may determine offset voltage $V_{offset}$ using the three phase pole voltages $V_{un}$, $V_{vn}$, and $V_{wn}$ as represented by Equation 2.

$$Voffset=(Vun+Vvn+Vwn)/3 \qquad \text{[Equation 2]}$$

The axis conversion unit 510 may also determine three phase voltages $V_{as}$, $V_{bs}$, and $V_{cs}$ applied to the respective phases of the motor 230 using the three phase pole voltages $V_{un}$, $V_{vn}$, and $V_{wn}$ and the offset voltage $V_{offset}$ as represented by Equation 3.

$$Vas=Vun-Voffset$$
$$Vbs=Vvn-Voffset$$
$$Vcs=Vwn-Voffset \qquad \text{[Equation 3]}$$

The axis conversion unit 510 may calculate two phase voltages $V_\alpha$ and $V_\beta$ of a stationary coordinate system using the three phase voltages $V_{as}$, $V_{bs}$, and $V_{cs}$ as represented by Equation 4. On the other hand, the axis conversion unit 510 may transform the two phase voltages $V_\alpha$ and $V_\beta$ of the stationary coordinate system into two phase voltages $V_d$ and $V_q$ of a rotating coordinate system.

$$\begin{bmatrix} V_\alpha \\ V_\beta \end{bmatrix} = \begin{bmatrix} 1 & 0 & 0 \\ 0 & 1/\sqrt{3} & -1/\sqrt{3} \end{bmatrix} \begin{bmatrix} V_{as} \\ V_{bs} \\ V_{cs} \end{bmatrix} \qquad \text{[Equation 4]}$$

The axis conversion unit 510 may output the transformed two phase currents $i_\alpha$ and $i_\beta$ of the stationary coordinate system, the transformed two phase voltages $V_\alpha$ and $V_\beta$ of the stationary coordinate system, the transformed two phase currents $i_d$ and $i_q$ of the rotating coordinate system, and the transformed two phase voltages $V_d$ and $V_q$ of the rotating coordinate system to the outside.

The estimation unit 520 may receive the axis-transformed two phase currents $i_\alpha$ and $i_\beta$ of the stationary coordinate system and the axis-transformed two phase voltages $V_\alpha$ and $V_\beta$ of the stationary coordinate system from the axis conversion unit 510 to estimate a rotor position θ and speed ω of the motor 230. Referring to FIG. 5B, the estimation unit 520 may include a back electromotive force estimation circuitry or unit 523 for estimating back electromotive force caused in the motor 230 and a speed estimation circuitry or unit 526 for estimating a rotor position $\hat{\theta}_r$ and speed $\hat{\omega}_r$ of the motor 230.

The back electromotive force estimation unit 523 may receive the two phase currents $i_\alpha$ and $i_\beta$ of the stationary coordinate system and the two phase voltages $V_\alpha$ and $V_\beta$ of the stationary coordinate system from the axis conversion unit 510 to estimate two phase back electromotive forces $Emf_\alpha$ and $Emf_\beta$ of the stationary coordinate system using a back electromotive force observer based on the stationary coordinate system.

The two phase back electromotive forces $Emf_\alpha$ and $Emf_\beta$ of the stationary coordinate system may be expressed as a function for the rotational speed and rotor position of the motor as represented by Equation 5.

$$\begin{bmatrix} Emf_\alpha \\ Emf_\beta \end{bmatrix} = \begin{bmatrix} \omega_r \lambda \sin\theta_r \\ -\omega_r \lambda \cos\theta_r \end{bmatrix} \qquad \text{[Equation 5]}$$

where $\omega_r$ indicates a rotational speed of the motor, $\theta_r$ indicates a rotor position of the motor, and λ indicates observed magnetic flux.

The speed estimation unit 526 may estimate the rotor position $\hat{\theta}_r$ of the motor 230 through arctangent calculation using the estimated back electromotive forces $Emf_\alpha$ and $Emf_\beta$ as represented by Equation 6.

$$\hat{\theta}_r = \tan^{-1}\left(\frac{-Emf_\alpha}{Emf_\beta}\right) = \tan^{-1}\left(\frac{\omega_r \lambda \sin\theta_r}{\omega_r \lambda \cos\theta_r}\right) \qquad \text{[Equation 6]}$$

The speed estimation unit 526 may estimate the rotor position $\hat{\theta}_r$ and speed $\hat{\omega}_r$ of the motor 230 using an all dimensional speed observer after the arctangent calculation.

As a result, the estimation unit 520 may output the estimated position $\hat{\theta}_r$ and the estimated speed $\hat{\omega}_r$ based on the input two phase currents $i_\alpha$ and $i_\beta$ of the stationary coordinate system and the input two phase voltages $V_\alpha$ and $V_\beta$ of the stationary coordinate system.

The current command generation unit 530 generates a current command value $i^*_q$ based on the estimated speed $\hat{\omega}_r$ and a speed command value $\omega^*_r$. For example, a PI (Proportional-Integral) controller 535 of the current command generation unit 530 may perform PI control based on a difference between the estimated speed $\hat{\omega}_r$ and the speed command value $\omega^*_r$ to generate a current command value $i^*_q$. Although a q-axis current command value $i^*_q$ is shown as the current command value in the drawing, it is possible to generate a d-axis current command value $i^*_d$ together with the q-axis current command value $i^*_q$. The d-axis current command value $i^*_d$ may be set to 0.

Meanwhile, the speed command value ω*r may be manually set according to operation signal from the manipulation keys 117 or automatically set according to washing, rinsing, or spin-drying cycles of the laundry treatment machine 100.

The current command generation unit 530 may further include a limiter (not shown) for limiting a level of the current command value $i^*_q$ such that the current command value $i^*_q$ does not exceed an allowable range.

The voltage command generation unit 540 may generate d-axis and q-axis voltage command values $V^*_d$ and $V^*_q$ based on d-axis and q-axis currents $i_d$ and $i_q$ axis-transformed into a two phase rotating coordinate system by the axis conversion unit and the current command value $i^*_d$ and $i^*_q$ generated by the current command generation unit 530. For example, a PI controller 544 of the voltage command generation unit 540 may perform PI control based on a difference between the q-axis current $i_q$ and the q-axis current command value $i^*_q$ to generate a q-axis voltage command value $V^*_q$. In addition, a PI controller 548 of the voltage command generation unit 540 may perform PI control based on a difference between the d-axis current $i_d$ and the d-axis current command value $i^*_d$ to generate a d-axis voltage command value $V^*_d$. The d-axis voltage command value $V^*_d$ may be set to 0 in response to a case in which the d-axis current command value $i^*_d$ is set to 0.

The voltage command generation unit 540 may further include a limiter (not shown) for limiting levels of the d-axis and q-axis voltage command values $V^*_d$ and $V^*_q$ such that the d-axis and q-axis voltage command values $V^*_d$ and $V^*_q$ do not exceed allowable ranges.

The generated d-axis and q-axis voltage command values $V^*_d$ and $V^*_q$ are input to the axis conversion unit 550. The axis conversion unit 550 receives the estimated position $\hat{\theta}_r$ and the d-axis and q-axis voltage command values $V^*_d$ and $V^*_q$ from the estimation unit 520 to perform axis transformation. The axis conversion unit 550 performs transformation from a two phase rotating coordinate system to a two phase stationary coordinate system. At this time, the position $\hat{\omega}_r$, estimated by the estimation unit 520 may be used.

Subsequently, the axis conversion unit 550 performs transformation from the two phase stationary coordinate system to a three phase stationary coordinate system. As a result, the axis conversion unit 550 outputs three phase output voltage command values V*a, V*b, and V*c. The switching control signal output unit 560 generates and outputs a PWM-based inverter switching control signal $S_{ic}$ based on the three phase output voltage command values V*a, V*b, and V*c.

The output inverter switching control signal $S_{ic}$ may be converted into a gate driving signal by a gate driving unit and then input to a gate of each switching device of the inverter 420. As a result, the respective switching devices Sa, S'a, Sb, S'b, Sc, and S'c of the inverter 420 may perform switching operations.

Figure 6:
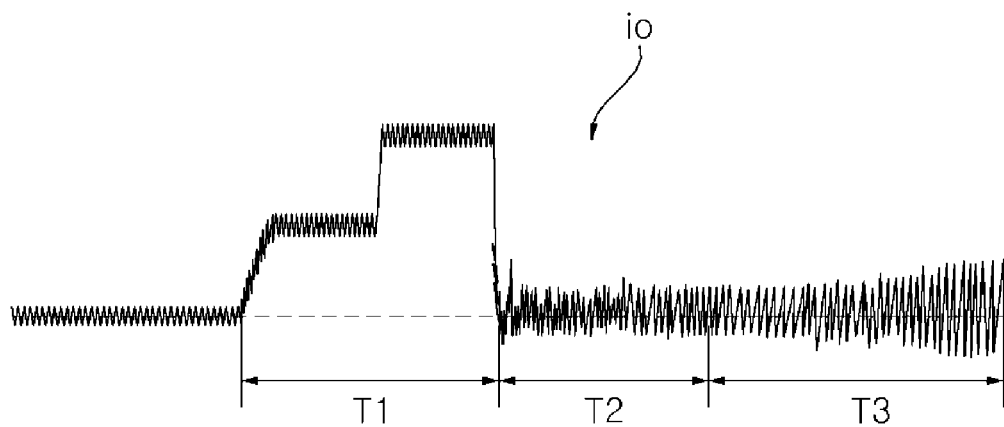
FIG. 6 is a view showing an example of alternating current (AC) current supplied to a motor shown in FIG. 4.

FIG. 6 is a view showing an example of AC current supplied to the motor shown in FIG. 4. According to switching operation of the inverter 420, current flows in the motor 230. An operation time period of the motor 230 may be divided into a starting operation time period T1, which is an initial operation time period, and normal operation time periods T2 and T3.

During the starting operation time period T1, the inverter controller 430 may set the estimated speed to be 0 such that the q-axis current command value i*q is 0 and set the d-axis current command value i*d to be a specific value. And the inverter controller 430 may output the inverter switching control signal Sic based on the d-axis current command value i*d. Thus, the constant current may be supplied to the motor 230.

During the normal operation time periods T2 and T3, the inverter controller 430 may generate current command values I*d and I*q based on the estimated speed not to be 0, generate voltage command values V*d and V*q based on the current command values rd and I*q, generate and output the inverter switching control signal Sic based on the voltage command values V*d and V*q. Thus, the predetermined AC current may be supplied to the motor 230 so as to rotate the motor 230 at a constant speed or at an accelerated speed.

The starting operation time period T1 may be referred to as a motor alignment time period during which a constant current is supplied to the motor 230. That is, in order to align the rotor of the motor 230 in a stationary state at a predetermined position, one of the three first switching devices of the inverter 420 is turned on and the other two second switching devices which do not make pairs with the turned-on first switching device are turned on.

During the starting operation time period T1, the rotor of the motor 230 remains stationary in a predetermined position. Consequently, it is possible to detect a stator resistance value $R_s$ of the motor 230 using information regarding output voltage and output current at this time.

In a case in which a voltage error $\Delta V$ is present, however, the detected resistance value may have a resistance error $\Delta R$. In order to solve this problem, the inverter controller 430 may control a constant first level current and a constant second level current to be sequentially supplied to the motor during the starting operation time period T1. It is possible to remove the resistance error $\Delta R$ by sequentially supplying the constant first level current and the constant second level current to the motor. Consequently, it is possible to accurately detect a stator resistance value $R_s$.

After the starting operation time period T1, the speed of the motor is gradually increased with the result that the motor is driven in a normal operation state. The normal operation time periods T2 and t3 may be divided into a low-speed operation time period T2 and a high-speed operation time period T3.

According to a sensorless position estimation method described in this specification, a position error is increased in a case in which the rotor position of the motor is estimated based on only output current detected by the output current detection unit E without using the output voltage detection unit F during the low-speed operation time period T2, which is a time period of 0 to 100 rpm. On the other hand, a position error is not increased during the high-speed operation time period T3, which is a time period of more than 100 rpm. Hence, the output voltage detection unit F may be used in addition to the output current detection unit E.

Figure 7A:
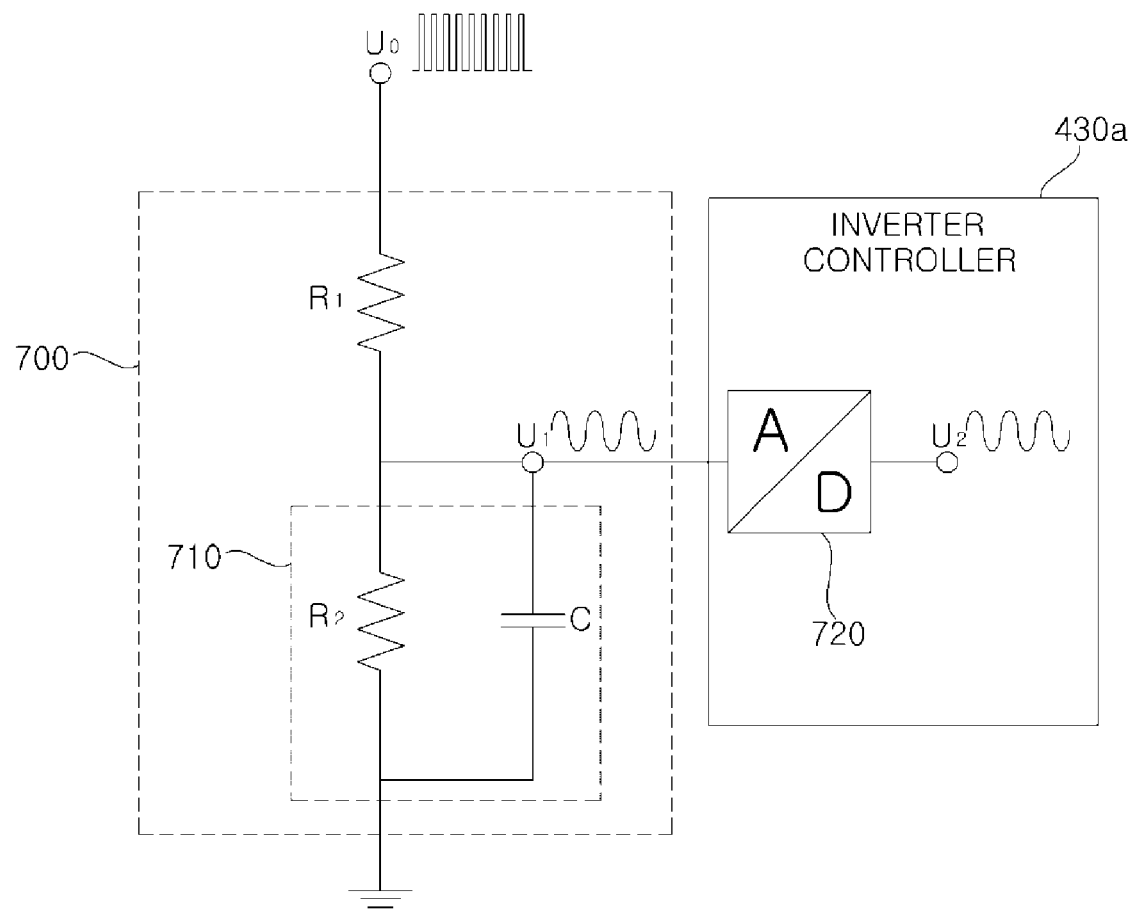
FIG. 7A is a circuit diagram exemplarily showing an output voltage detection unit of the laundry treatment machine.
Figure 7B:
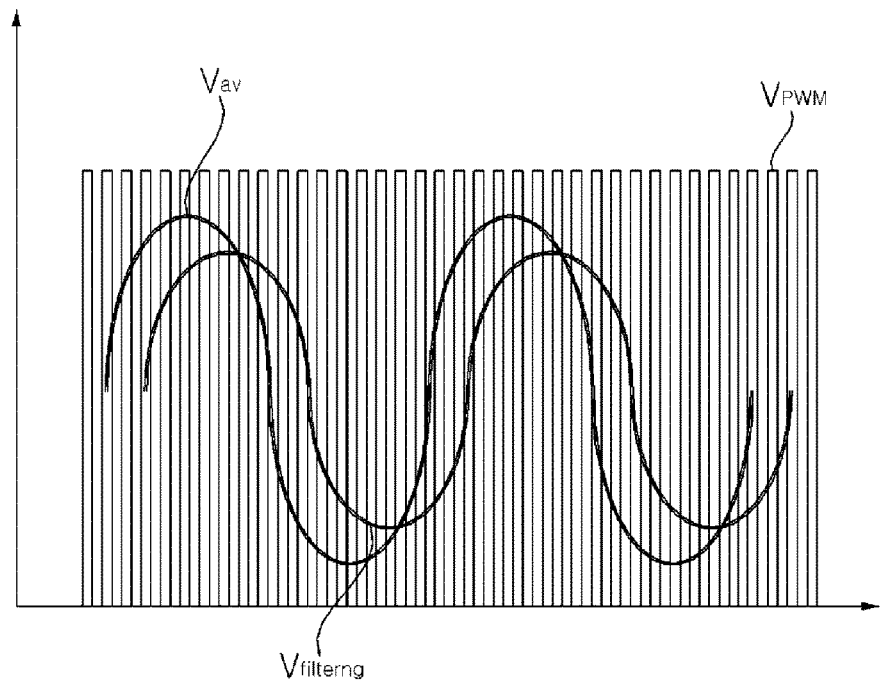
FIGS. 7B and 7C are reference views illustrating operation of the output voltage detection unit shown in FIG. 7A.
Figure 7C:
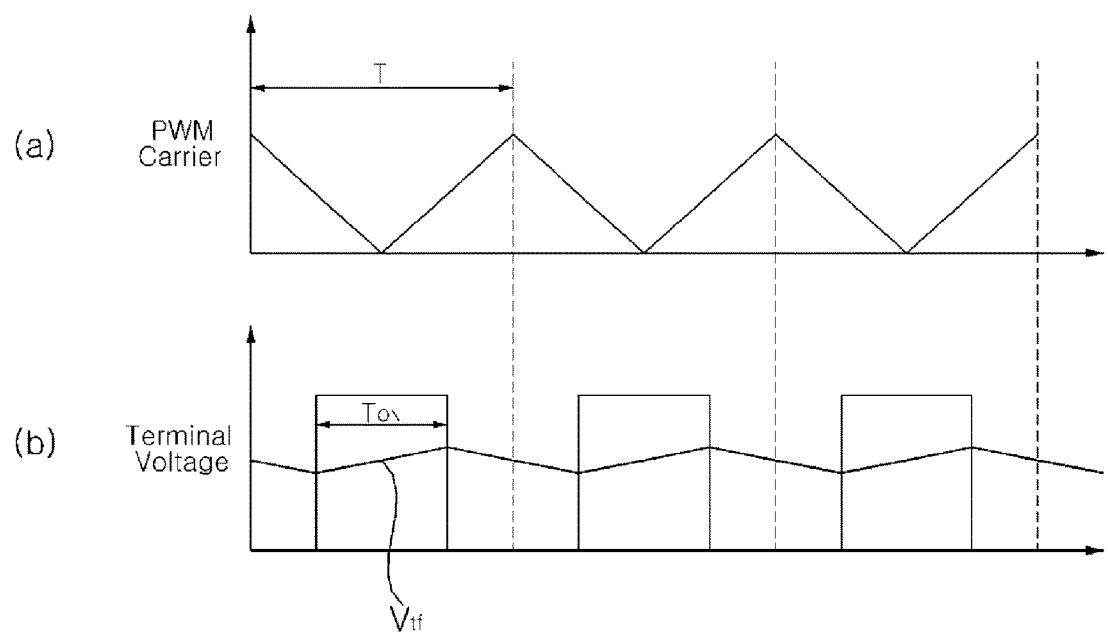

FIG. 7A is a circuit diagram exemplarily showing an output voltage detection unit F of the laundry treatment machine and FIGS. 7B and 7C are reference views illustrating operation of the output voltage detection unit shown in FIG. 7A. An output voltage detection unit 700, which is a normal voltage detection unit, includes resistors $R_1$ and $R_2$ and a capacitor C. The resistors $R_1$ and $R_2$ and the capacitor C of the output voltage detection unit 700 are connected to any one of three phase terminals $U_o$, $V_o$, and $W_o$ of the inverter 420.

The resistor $R_2$ and the capacitor C of the output voltage detection unit 700 form an RC filter 710 for performing low-pass filtering. A pulse type waveform detected from each of the three phase terminals is converted into an analog signal through low-pass filtering. The inverter controller 430, e.g., the axis conversion unit 510, receives the low-pass filtered analog signal. For this reason, it is necessary for the inverter controller 430 to include an analog/digital (A/D) converter 720 for converting the analog signal into a discrete signal.

FIG. 7B shows a comparison between an average voltage $V_{av}$ of real output voltages detected by the output voltage detection unit 700 of FIG. 7A and a low-pass filtered voltage $V_{filtering}$ as voltage of a terminal $U_1$ of FIG. 7A. The amplitude and phase of the detected PWM average voltage have an error due to the low pass filter of FIG. 7A. Furthermore, as an operation frequency is increased, a voltage information error is also increased with the result that sensorless operation performance may be lowered.

FIG. 7C is a reference view illustrating acquisition of pole voltage in the inverter controller 430. FIG. 7C(a) shows a PWM carrier signal having a predetermined period T in the switching control signal output unit 560. The PWM carrier signal is used for generating and outputting a PWM-based inverter switching control signal Sic. FIG. 7C(b) shows a turn-on duty Ton based on the PWM carrier signal and a terminal voltage Vtf indicating a difference voltage between phase voltage and neutral voltage. In a case in which the output voltage detection unit 700 of FIG. 7A is used, it is necessary to further provide the A/D converter 720. For this reason, the magnitude of the detected voltage information, for example the magnitude of the detected terminal voltage Vtf may have an error according to ADC triggering timing during the turn-on duty Ton. In order to solve the above problem, the present disclosure proposes an output voltage detection unit that is capable of directly detecting PWM-based pulse type output voltage without additional conversion into an analog signal using resistors and a comparator.

Figure 8A:
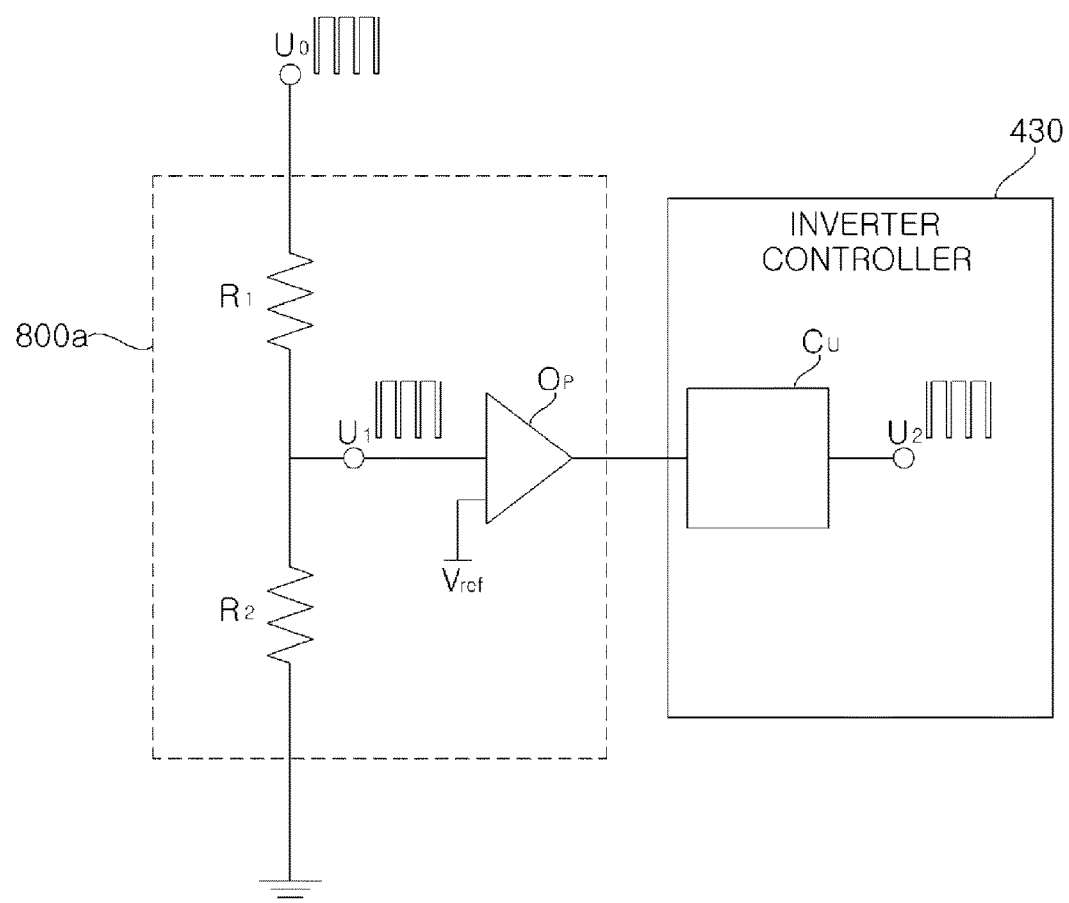
FIG. 8A is a circuit diagram exemplarily showing an output voltage detection unit of a laundry treatment machine according to an embodiment of the present disclosure.
Figure 8B:
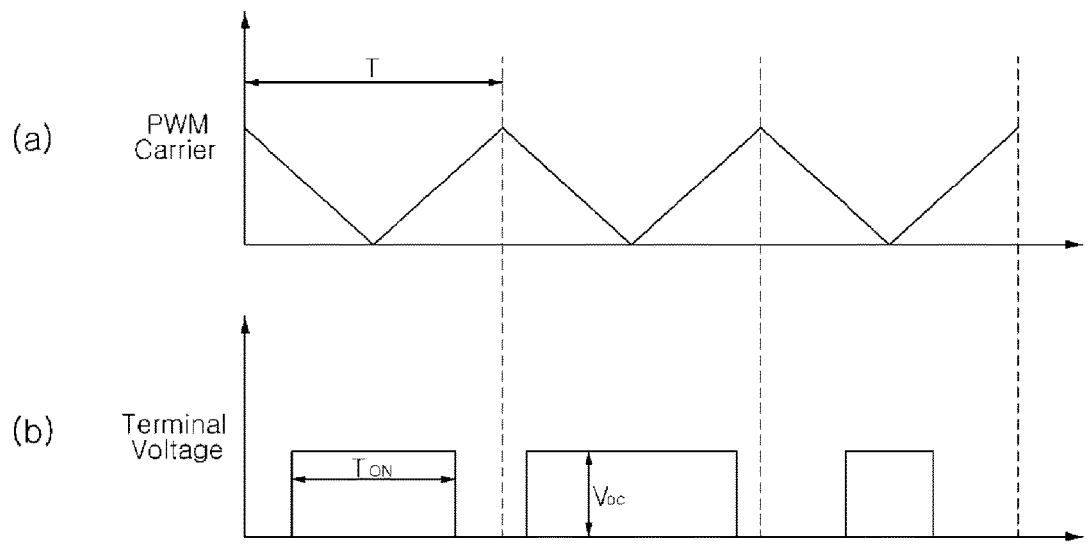
FIG. 8B is a reference view illustrating operation of the output voltage detection unit shown in FIG. 8A.

FIG. 8A is a circuit diagram exemplarily showing an output voltage detection unit of a laundry treatment machine according to an embodiment of the present disclosure and FIG. 8B is a reference view illustrating operation of the output voltage detection unit shown in FIG. 8A. The output voltage detection unit 800a of FIG. 8A may be applied for each of the output terminals $U_o$, $V_o$, and $W_o$ of the inverter 420. Referring to the drawings, an output voltage detection unit 800a includes resistors $R_1$ and $R_2$ and a comparator $O_p$.

The first resistor $R_1$ is electrically connected between the inverter 420 and the motor 230. Specifically, the first resistor $R_1$ is electrically connected to any one $U_o$ of output terminals $U_o$, $V_o$, and $W_o$ of the inverter 420.

The second resistor $R_2$ is connected between the first resistor $R_1$ and a ground. The first resistor $R_1$ and the second resistor $R_2$ are connected in series to each other. As a result, output voltage output from the output terminal $U_o$ of the inverter 420 is divided by the first resistor $R_1$ and the second resistor $R_2$.

The comparator $O_p$ is connected between a node $U_1$ located between the first resistor $R_1$ and the second resistor $R_2$ and the inverter controller 430. The output voltage divided by the second resistor $R_2$ is input to the comparator $O_p$. The comparator $O_p$ compares the divided output voltage with reference voltage $V_{ref}$ and outputs a result value.

In a case in which PWM-based pulse type output voltage is output from the output terminal $U_o$ of the inverter 420, the output voltage is divided by the resistors $R_1$ and $R_2$ of the output voltage detection unit 800a of FIG. 8A and divided pulse type voltage is directly input to the comparator $O_p$. Only in a case in which the pulse type voltage is equal to or greater than the reference voltage $V_{ref}$, the pulse type voltage is output.

Consequently, the inverter controller 430 may receive the detected pulse type output voltage without an additional AD converter. Meanwhile, the inverter controller 430 may directly capture the detected pulse type output voltage using a capturing unit $C_u$ and then immediately perform duty calculation.

FIG. 8B(a) exemplarily shows a unit time period T of a carrier signal for generating a PWM switching control signal and FIG. 8B(b) exemplarily shows a duty based on the detected pulse type output voltage.

FIG. 8B(a) shows a PWM carrier signal having a predetermined period T in the switching control signal output unit 560. The PWM carrier signal is used for generating and outputting a PWM-based inverter switching control signal $S_{ic}$. FIG. 8B(b) shows a terminal voltage Vtf which may be calculated based on changeable turn-on duty Ton and a constant voltage Vdc.

As shown in FIG. 8B, ON time, i.e. a duty, may be calculated within the unit time period T of the carrier signal based on the detected pulse type output voltage. An average pole voltage $V_{pn}$ may be calculated using the duty $T_{on}$, the DC terminal voltage $V_{dc}$, and the unit time period T of the carrier signal as in Equation 1 as previously described.

As a result, the output voltage detection unit 800a of FIG. 8A may rapidly detect pulse type output voltage through level adjustment based on voltage division without additional conversion, such as low-pass filtering. In addition, the inverter controller 430 does not need an additional AD converter with the result that ON time, i.e. a duty, can be accurately calculated. The comparison between the output voltage and the reference voltage is performed by the comparator $O_p$ with the result that it is possible to remove a noise component.

After calculation of the average pole voltage $V_{pn}$, the inverter controller 430 may calculate the offset voltage $V_{offset}$, the three phase voltages $V_{as}$, $V_{bs}$, and $V_{cs}$, the two phase voltages $V_\alpha$ and $V_\beta$ of the stationary coordinate system, the estimated back electromotive forces $Emf_\alpha$ and $Emf_\beta$, the estimated position and $\hat{\theta}_r$ and the estimated speed $\hat{\omega}_r$, using Equations 2 to 6 as previously described. Based on the above, the inverter controller 430 may output a switching control signal for controlling the inverter to accurately control the motor in the sensorless mode.

Figure 9:
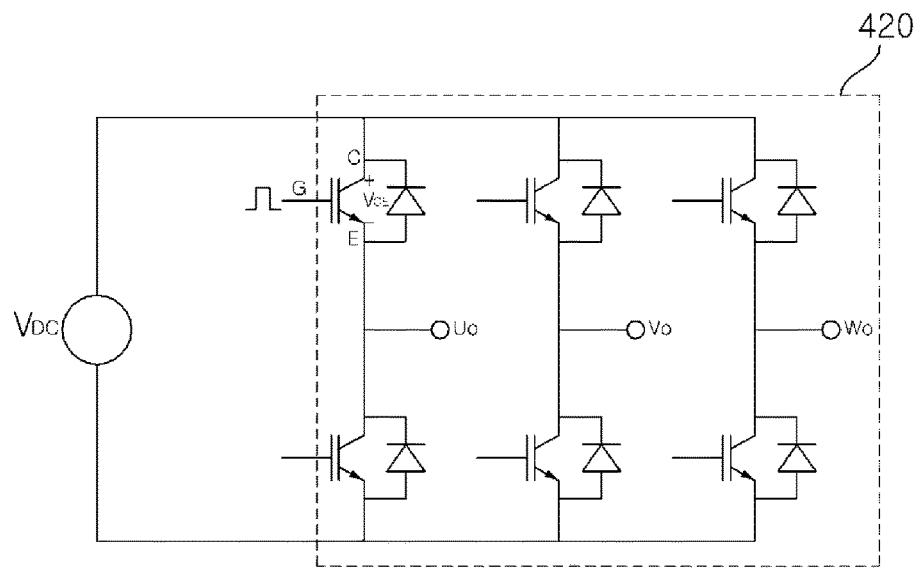
FIG. 9 is a view showing an inverter in a driving unit of a laundry treatment machine according to an embodiment of the present disclosure.
Figure 10A:
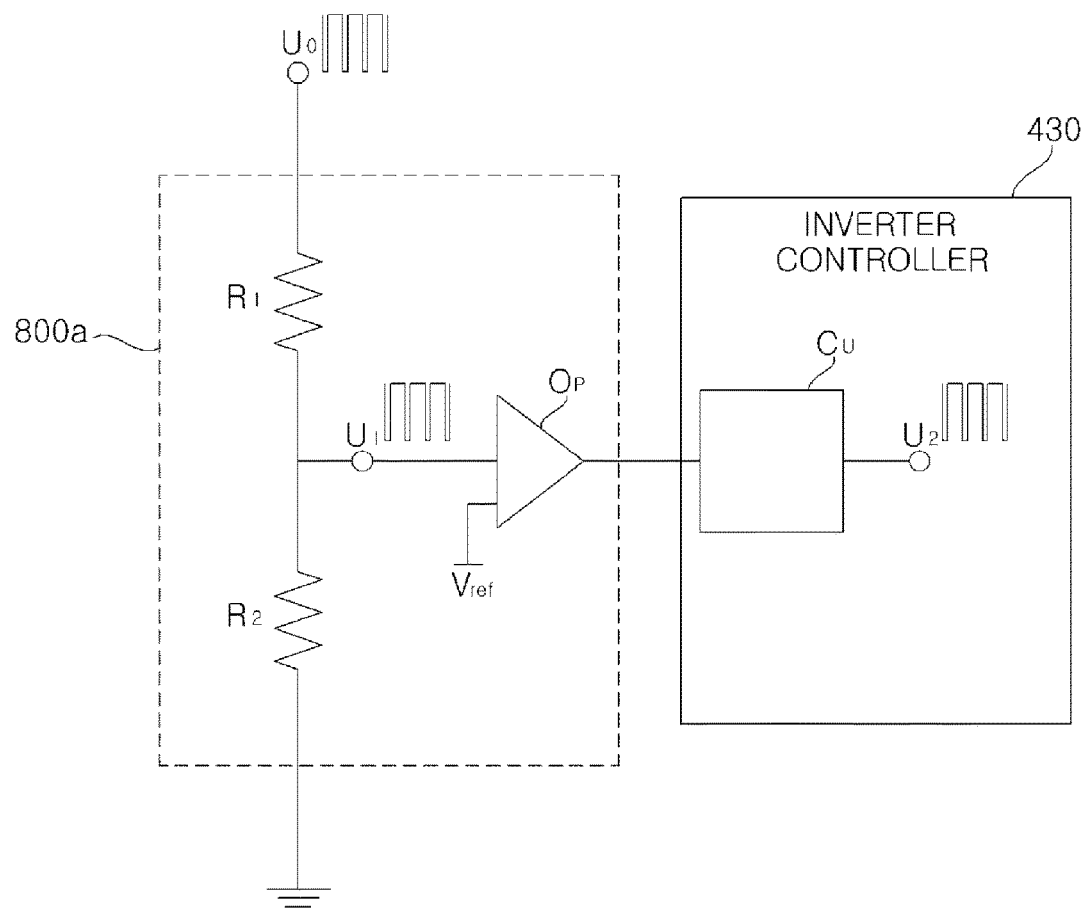
FIGS. 10A to 10C are views exemplarily showing out voltage detection units for respective phases of the inverter shown in FIG. 9.
Figure 10B:
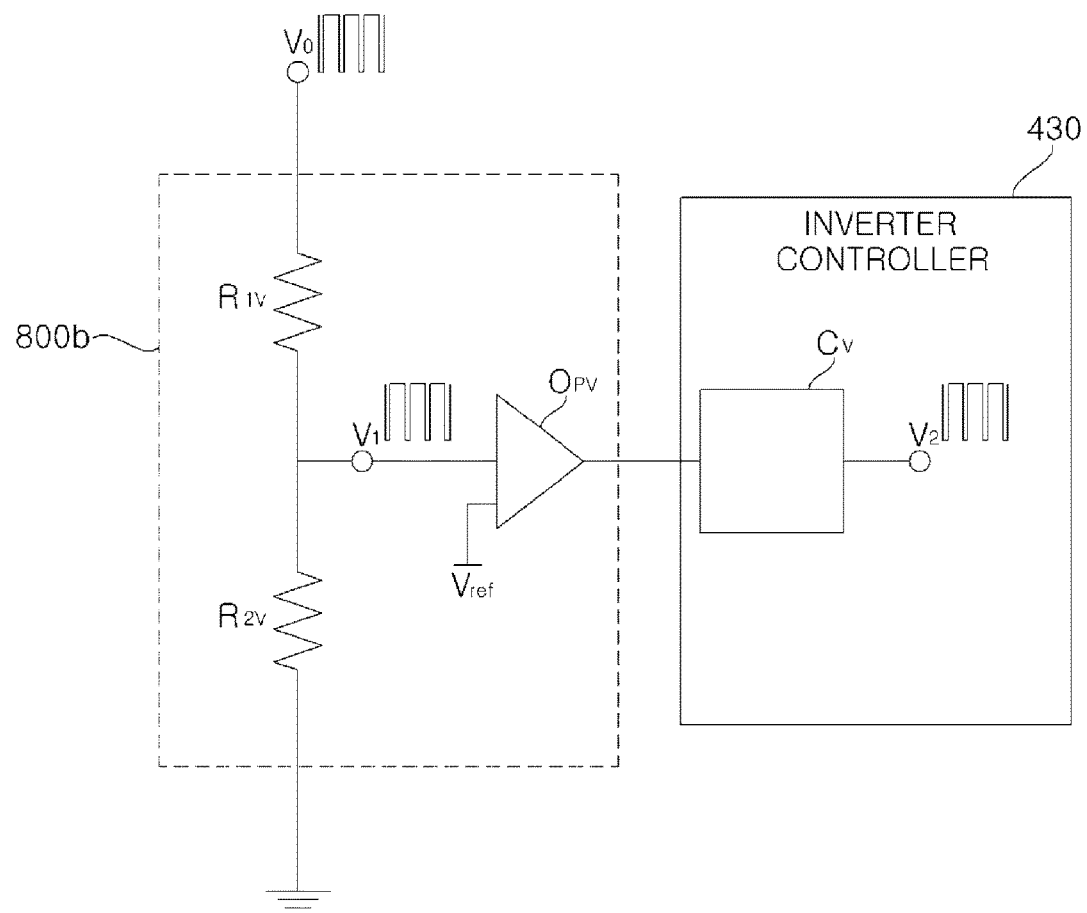
Figure 10C:
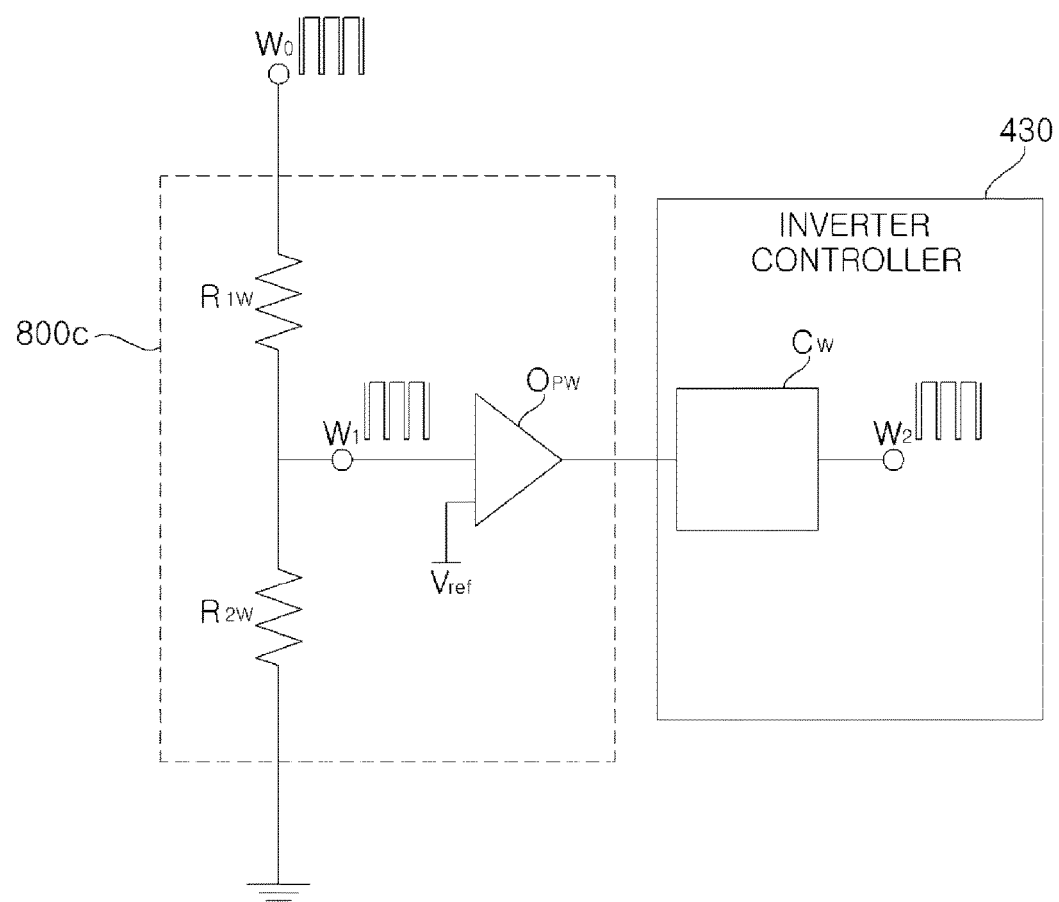

FIG. 9 is a view showing an inverter in a driving unit of a laundry treatment machine according to an embodiment of the present disclosure. FIGS. 10A to 10C are views exemplarily showing out voltage detection units for respective phases of the inverter shown in FIG. 9.

FIG. 9 exemplarily shows that an inverter 420 includes a plurality of three phase switching devices. In addition, respective output terminals $U_o$, $V_o$, and $W_o$ of the inverter 420 are exemplarily shown in FIG. 9.

FIG. 10A exemplarily shows a first output voltage detection unit 800a electrically connected to the first output terminal $U_o$ of the respective output terminals $U_o$, $V_o$, and $W_o$ of the inverter 420 as in FIG. 8A. FIG. 10B exemplarily shows a second output voltage detection unit 800b electrically connected to the second output terminal $V_o$ of the respective output terminals $U_o$, $V_o$, and $W_o$ of the inverter 420. FIG. 10C exemplarily shows a third output voltage detection unit 800c electrically connected to the third output terminal $W_o$ of the respective output terminals $U_o$, $V_o$, and $W_o$ of the inverter 420.

The second output voltage detection unit 800b includes resistors $R_{1v}$ and $R_{2v}$ electrically connected to the second output terminal $V_o$ and a comparator $O_{pv}$ for comparing voltage detected by the resistor $R_{2v}$ with reference voltage $V_{ref}$ to detect PWM-based output voltage.

The third output voltage detection unit 800c includes resistors $R_{1w}$ and $R_{2w}$ electrically connected to the third output terminal $W_o$ and a comparator $O_{pw}$ for comparing voltage detected by the resistor $R_{2w}$ with the reference voltage $V_{ref}$ to detect PWM-based output voltage.

The PWM-based output voltages, corresponding to the respective output terminals, detected by the first to third output voltage detection units 800a, 800b, and 800c are input to the inverter controller 430 as shown in the drawings.

Meanwhile, the sensorless laundry treatment machine according to the present disclosure may be applied to a front load type laundry treatment machine in addition to the top load type laundry treatment machine of FIG. 1.

Figure 11:
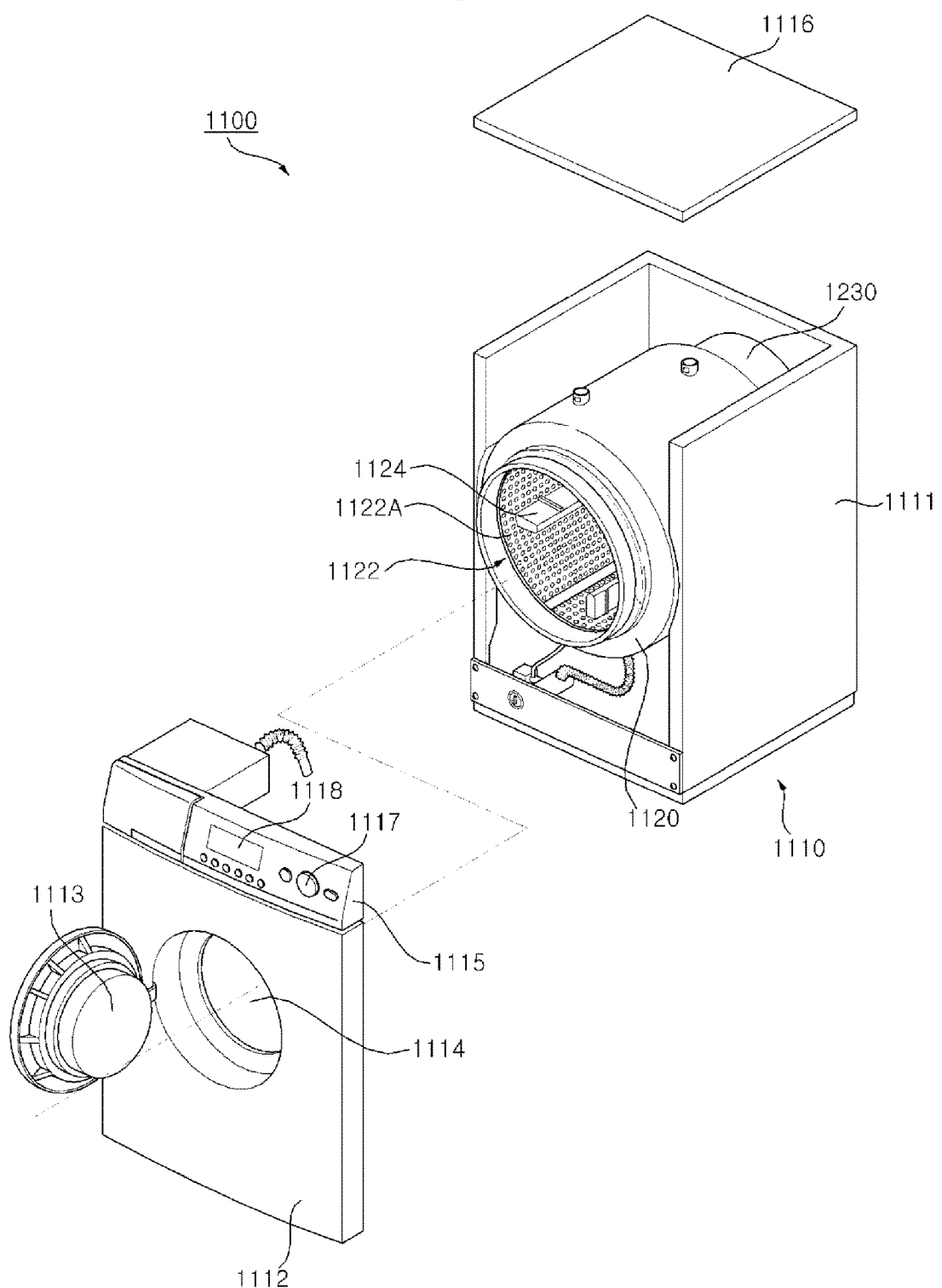
FIG. 11 is a perspective view showing another example of a laundry treatment machine according to another embodiment of the present disclosure.

Referring to FIG. 11, a laundry treatment machine 1100 according to another embodiment of the present disclosure is a front load type laundry treatment machine configured such that laundry is introduced into a washing tub from the front. The front load type laundry treatment machine may be operated in a sensorless mode as previously described with reference to FIGS. 1 to 10. In particular, the output voltage detection unit 800a as shown in FIG. 8A may be applied to the front load type laundry treatment machine of FIG. 11.

Hereinafter, a description will be given of the front load type laundry treatment machine of FIG. 11.

Referring to FIG. 11, the laundry treatment machine 1100, which is a drum type laundry treatment machine, includes a cabinet 1110 forming the external appearance of the laundry treatment machine 1100, a tub 1120 disposed in the cabinet 1110 such that the tub 1120 is supported by the cabinet 1110, a drum 1122 disposed in the tub 1120 for washing laundry, a motor 1130 for driving the drum 1122, a wash water supply device (not shown) disposed at the outside of a cabinet body 1111 for supplying wash water into the cabinet 1110, and a drainage device (not shown) disposed at the lower side of the tub 1120 for draining wash water to the outside.

The drum 1122 may be provided with a plurality of through holes 1122A, through which wash water flows. In addition, the drum 1122 may be provided at the inner circumference thereof with lifters 1124 for raising laundry to a predetermined height such that the laundry drops due to gravity during rotation of the drum 1122.

The cabinet 1110 includes a cabinet body 1111, a cabinet cover 1112 disposed at the front of the cabinet body 1111 in a state in which the cabinet cover 1112 is coupled to the cabinet body 1111, a control panel 1115 disposed at the upper side of the cabinet cover 1112 in a state in which the control panel 1115 is coupled to the cabinet body 1111, and a top plate 1116 disposed at the upper side of the control panel 1115 in a state in which the top plate 1116 is coupled to the cabinet body 1111.

The cabinet cover 1112 includes a laundry introduction port 1114, through which laundry is introduced into the drum 1122, and a door 1113 horizontally hinged to the cabinet cover 1112 for opening and closing the laundry introduction port 1114.

The control panel 1115 includes manipulation keys 1117 for allowing a user to manipulate an operation state of the laundry treatment machine 1100 and a display 1118 disposed at one side of the manipulation keys 1117 for displaying the operation state of the laundry treatment machine 1100.

The manipulation keys 1117 and the display 1118 of the control panel 1115 are electrically connected to a controller. The controller electrically controls components of the laundry treatment machine 1100.

Meanwhile, the drum 1122 may be provided with an automatic balancer. The automatic balancer functions to reduce vibration generated from the drum 1122 due to eccentricity of laundry received in the drum 1122. A liquid balancer or a ball balancer may be used as the automatic balancer.

Meanwhile, although not shown, the laundry treatment machine 1100 may further include a vibration sensor for measuring vibration of the drum 1122 or the cabinet 1110.

The motor driving method or the operation method of the laundry treatment machine according to the embodiments of the present disclosure may be realized as code, which is readable by a processor included in the motor driving apparatus or the laundry treatment machine, in recording media readable by the processor. The recording media readable by the processor includes all kinds of recording devices to store data which are readable by the processor. As can be appreciated, various functions and/or circuits may be implemented by a processor and/or controller executing codes or programs from a readable media. Further, various circuitry or circuits may be implemented by at least one module.

The motor driving apparatus and the laundry treatment machine including the same according to the embodiments of the present disclosure are a sensorless motor driving apparatus which does not have a position sensor to sense the position of a rotor of a motor and a laundry treatment machine including the same. In the motor driving apparatus and the laundry treatment machine including the same according to the embodiments of the present disclosure, a resistor electrically connected between an inverter and the motor and a comparator to compare voltage detected by the resistor with reference voltage and to detect PWM-based output voltage are used. Consequently, it is possible to efficiently and accurately detect output voltage applied to the motor.

A pulse type output voltage may be rapidly detected through level adjustment based on voltage division without additional conversion, such as low-pass filtering. In addition, an inverter controller does not need an additional AD converter with the result that ON time, i.e. a duty, can be accurately calculated. Meanwhile, comparison between the output voltage and the reference voltage is performed by the comparator with the result that it is possible to remove a noise component.

A PWM-based output voltage is detected, a rotor position and speed of the motor are estimated based on the detected output voltage, and a switching control signal for controlling the inverter is output based on the estimated rotor position and speed of the motor. Consequently, it is possible to accurately control the motor in a sensorless mode.

A constant first level current and a constant second level current are sequentially supplied to the motor during a starting operation of the motor. Consequently, it is possible to accurately estimate stator resistance of the motor.

The present disclosure provides a motor driving apparatus that is capable of efficiently detecting voltage applied to a motor in a sensorless laundry treatment machine and a laundry treatment machine including the same.

A laundry treatment machine includes a washing tub, a motor to rotate the washing tub, and a driving unit to drive the motor, wherein the driving unit includes an inverter to convert direct current (DC) voltage into alternating current (AC) voltage and to output the AC voltage to the motor, an output voltage detection unit to detect output voltage applied to the motor, and an inverter controller to control the inverter to drive the motor based on the output voltage and wherein the output voltage detection unit includes a resistor electrically connected between the inverter and the motor and a comparator to compare voltage detected by the resistor with reference voltage and to detect pulse width modulation (PWM)-based output voltage.

A motor driving apparatus includes an inverter to convert DC voltage into AC voltage and to output the AC voltage to a motor, an output voltage detection unit to detect output voltage applied to the motor, and an inverter controller to control the inverter to drive the motor based on the output voltage, wherein the output voltage detection unit includes a resistor electrically connected between the inverter and the motor and a comparator to compare voltage detected by the resistor with reference voltage and to detect PWM-based output voltage.

This application is related to U.S. application Ser. Nos. 14/535,702, 14/535,780, and 14/535,595 filed on Nov. 7, 2014, whose entire disclosures are incorporated herein by reference.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laundry treatment machine comprising:
a washing tub;
a motor to rotate the washing tub; and
a driving circuit to control the motor,
wherein the driving circuit includes:
an inverter to convert a direct current (DC) voltage into an alternating current (AC) voltage and to output the AC voltage to the motor;
an output voltage detector to detect an output voltage applied to the motor; and
an inverter controller to control the inverter to drive the motor based on the output voltage,
wherein the output voltage detector includes:
a resistor electrically connected between the inverter and the motor; and
a comparator to compare a voltage detected by the resistor with a reference voltage and to output a pulse width modulation (PWM)-based pulse type output voltage, and
wherein the inverter controller includes capturing circuitry that captures the PWM-based pulse type output voltage from the comparator, determines a duty of the detected PWM-based pulse type output voltage using the capturing circuitry, and calculates a phase voltage of the motor based on the calculated duty.

2. The laundry treatment machine according to claim 1, wherein the inverter controller estimates a rotor position and speed of the motor based on the detected PWM-based pulse type output voltage and outputs a switching control signal for controlling the inverter based on the estimated rotor position and speed of the motor.

3. The laundry treatment machine according to claim 1, further comprising:
an output current detector to detect output current flowing in the motor,
wherein the inverter controller estimates a rotor position of the motor based on the detected output current d the detected PWM-based wise type output voltage and outputs an inverter switching control signal for controlling the inverter based on the estimated rotor position of the motor.

4. The laundry treatment machine according to claim 1, further comprising:
an output current detector to detect output current flowing in the motor,
wherein the inverter controller includes:
an estimation circuitry to estimate a rotor position and speed of the motor based on the detected output current and the detected PWM-based pulse type output voltage;
a current command generation circuitry to generate a current command value based on the estimated speed of the motor and a speed command value;
a voltage command generation circuitry to generate a voltage command value based on the current command value and the detected output current; and
a switching control signal output circuitry to output a switching control signal for driving the inverter based on the voltage command value.

5. The laundry treatment machine according to claim 4, wherein the estimation circuitry comprises:
a back electromotive force estimation circuitry to estimate back electromotive force generated from the motor based on the detected output current and the detected PWM-based pulse type output voltage; and
a speed estimation circuitry to estimate the rotor position and speed of the motor based on the estimated back electromotive force.

6. The laundry treatment machine according to claim 1, wherein the inverter controller controls a constant first level current and a constant second level current to be sequentially supplied to the motor during a starting operation of the motor.

7. The laundry treatment machine according to claim 1, wherein the inverter controller calculates an average pole voltage using the calculated duty, a DC terminal voltage corresponding to the DC voltage in the inverter, and a unit time period of a carrier signal.

8. The laundry treatment machine according to claim 7, wherein after calculation of the average pole voltage, the inverter controller calculates an offset voltage, three phase voltages, the two phase voltages of the stationary coordinate system, estimated back electromotive forces, an estimated position, and an estimated speed.

9. A motor driving apparatus comprising:
an inverter to convert DC voltage into AC voltage and to output the AC voltage to a motor;
an output voltage detector to detect output voltage applied to the motor; and
an inverter controller to control the inverter to drive the motor based on the output voltage,
wherein the output voltage detector includes:
a resistor electrically connected between the inverter and the motor; and
a comparator to compare voltage detected by the resistor with reference voltage and to detect a pulse width modulation (PWM)-based pulse type output voltage,
wherein the inverter controller includes a capturing circuitry that captures the PWM-based pulse type output voltage from the comparator, determines a duty of the detected PWM-based pulse type output voltage using the capturing circuitry, and calculates phase voltage of the motor based on the calculated duty.

10. The motor driving apparatus according to claim 9, wherein the inverter controller estimates a rotor position and speed of the motor based on the detected PWM-based pulse type output voltage and outputs a switching control signal for controlling the inverter based on the estimated rotor position and speed of the motor.

11. The motor driving apparatus according to claim 9, wherein the inserter controller calculates a duty of the detected PWM-based pulse-type output voltage and calculates phase voltage of the motor based on the calculated duty.

12. The motor driving apparatus according to claim 9, further comprising:
an output current detector to detect output current flowing in the motor, wherein the inverter controller estimates a rotor position of the motor based on the detected output current and the detected PWM-based pulse type output voltage and outputs an inverter switching control signal for controlling the inverter based on the estimated rotor position of the motor.

13. The motor driving apparatus according to claim 9, further comprising:
an output current detector to detect output current flowing in the motor, wherein the inverter controller includes:
an estimation circuitry to estimate a rotor position and speed of the motor based on the detected output current and the detected PWM-based pulse type output voltage;
a current command generation circuitry to generate a current command value based on the estimated speed of the motor and a speed command value;
a voltage command generation circuitry to generate a voltage command value based on the current command value and the detected output current; and
a switching control signal output circuitry to output a switching control signal for driving the inverter based on the voltage command value.

14. The motor driving apparatus according to claim 13, wherein the estimation circuitry comprises:
a back electromotive force estimation circuitry to estimate back electromotive force generated from the motor based on the detected output current and the detected PWM-based pulse type output voltage; and
a speed estimation circuitry to estimate the rotor position and speed of the motor based on the estimated back electromotive force.

15. The motor driving apparatus according to claim 9, wherein the inverter controller controls a constant first level current and a constant second level current to be sequentially supplied to the motor during a starting operation of the motor.

16. The motor driving apparatus according to claim 9, wherein the inverter controller calculates an average pole voltage using the calculated duty, a DC terminal voltage corresponding to the DC voltage in the inverter, and a unit time period of a carrier signal.

17. The motor driving apparatus according to claim 16, wherein after calculation of the average pole voltage, the inverter controller calculates an offset voltage, three phase voltages, the two phase voltages of the stationary coordinate system, estimated back electromotive forces, an estimated position, and an estimated speed.

* * * * *